(12) United States Patent
Langland

(10) Patent No.: US 7,030,365 B2
(45) Date of Patent: Apr. 18, 2006

(54) EMITTER-DETECTOR ASSEMBLY FOR A REFLEX PHOTOELECTRIC OBJECT DETECTION SYSTEM

(75) Inventor: Kenneth A. Langland, Seattle, WA (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 10/824,882

(22) Filed: Apr. 15, 2004

(65) Prior Publication Data

US 2005/0230603 A1    Oct. 20, 2005

(51) Int. Cl.
*H05B 37/00* (2006.01)

(52) U.S. Cl. ..................... 250/221; 315/120
(58) Field of Classification Search ............... 250/221; 315/120
See application file for complete search history.

(56) References Cited

U.S. PATENT DOCUMENTS

| | | |
|---|---|---|
| 3,619,058 A | 11/1971 | Hewlett et al. |
| 3,728,026 A | 4/1973 | Idestrom et al. |
| 3,752,581 A | 8/1973 | Everest et al. |
| 3,900,260 A | 8/1975 | Wendt |
| 3,996,476 A | 12/1976 | Lazzara |
| 4,113,381 A | 9/1978 | Epstein |
| 4,113,831 A | 9/1978 | Epstein |
| 4,153,366 A | 5/1979 | Mamon et al. |
| 4,159,873 A | 7/1979 | Farnsworth |
| 4,498,764 A | 2/1985 | Bolkow et al. |
| 4,521,107 A | 6/1985 | Chaborski et al. |
| 4,605,081 A | 8/1986 | Helmly, Jr. et al. |
| 4,614,968 A | 9/1986 | Rattman et al. |
| 4,626,053 A | 12/1986 | Fayfield |
| 4,644,341 A | 2/1987 | Warner |
| 4,699,508 A | 10/1987 | Bolkow et al. |
| 4,790,402 A | 12/1988 | Field et al. |
| 4,846,297 A | 7/1989 | Field et al. |
| 4,851,660 A | 7/1989 | Juds et al. |
| 4,878,407 A | 11/1989 | Harrison et al. |
| 4,880,966 A | 11/1989 | Goodrich et al. |
| 4,931,631 A | 6/1990 | Jackson |
| 4,961,490 A | 10/1990 | Risko et al. |
| 4,996,468 A | 2/1991 | Field et al. |
| 5,054,911 A | 10/1991 | Ohishi et al. |
| 5,056,437 A | 10/1991 | Maddock |
| 5,198,664 A | 3/1993 | Fayfield |
| 5,200,607 A | 4/1993 | Klima |
| 5,206,697 A | 4/1993 | Schwartz |
| 5,247,184 A | 9/1993 | Kimball |
| 5,322,074 A | 6/1994 | Cross, Jr. |
| 5,326,968 A | 7/1994 | Johnson et al. |
| 5,331,150 A | 7/1994 | Marsh |

(Continued)

*Primary Examiner*—Thanh X. Luu
*Assistant Examiner*—Tony Ko
(74) *Attorney, Agent, or Firm*—George E. Haas; Quarles & Brady LLP

(57) ABSTRACT

A system for sensing the presence of nearby objects includes an emitter-detector assembly and retroreflector. The emitter-detector assembly has a light emission area from which light is transmitted toward the retroreflector. The retroreflector returns that light to a light detection area of the emitter-detector assembly which produces a signal indicating an unbroken light path. Objects passing near the assembly interrupt the light path thereby providing an indication of their presence. The light emission area and the light detection area are concentric to each other which enables the light detection area to have close proximity to the light emission area. That parameter optimizes response to light from the retroreflector, while minimizing response to light reflected by other objects.

16 Claims, 1 Drawing Sheet

U.S. PATENT DOCUMENTS

| | | |
|---|---|---|
| 5,477,869 A | 12/1995 | Cross, Jr. |
| 5,496,996 A | 3/1996 | Barnes et al. |
| 5,500,523 A | 3/1996 | Hamanaka |
| 5,559,496 A | 9/1996 | Dubats |
| 5,563,798 A | 10/1996 | Berken et al. |
| 5,600,906 A | 2/1997 | Hamid |
| 5,642,850 A | 7/1997 | Sadler et al. |
| 5,663,621 A | 9/1997 | Popat |
| 5,684,596 A | 11/1997 | Eslinger et al. |
| 5,685,987 A | 11/1997 | Hixon, Jr. et al. |
| 5,707,523 A | 1/1998 | Temple |
| 5,729,024 A | 3/1998 | Baba et al. |
| 5,740,062 A | 4/1998 | Berken et al. |
| 5,749,821 A | 5/1998 | Simmons |
| 5,755,550 A | 5/1998 | Brandt et al. |
| 5,757,489 A | 5/1998 | Kawakami |
| 5,767,971 A | 6/1998 | Kawai et al. |
| 5,818,062 A | 10/1998 | Baba et al. |
| 5,828,056 A | 10/1998 | Alderman et al. |
| 5,828,456 A | 10/1998 | Aoki et al. |
| 5,829,231 A | 11/1998 | Harding et al. |
| 5,868,657 A | 2/1999 | Simmons |
| 5,872,646 A | 2/1999 | Alderman et al. |
| 5,879,626 A | 3/1999 | Watterson et al. |
| 5,880,822 A | 3/1999 | Kubo |
| 5,929,436 A | 7/1999 | Baba et al. |
| 5,941,444 A | 8/1999 | Sadler et al. |
| 6,010,223 A | 1/2000 | Gubela, Sr. |
| 6,018,159 A | 1/2000 | Alderman et al. |
| 6,036,209 A | 3/2000 | Tsumura et al. |
| 6,151,185 A | 11/2000 | Ishizuka et al. |
| 6,186,388 B1 | 2/2001 | Sadler et al. |
| 6,198,540 B1 | 3/2001 | Ueda et al. |
| 6,213,680 B1 | 4/2001 | Schaeffer et al. |
| 6,229,598 B1 | 5/2001 | Yoshida |
| 6,279,881 B1 | 8/2001 | Nishi |
| 6,344,656 B1 | 2/2002 | Hopkins et al. |
| 6,377,167 B1 | 4/2002 | Juds et al. |
| 6,403,223 B1 | 6/2002 | Albro et al. |
| 6,412,535 B1 | 7/2002 | Barolovits et al. |
| 6,433,332 B1 | 8/2002 | Chin et al. |
| 6,492,775 B1 * | 12/2002 | Klotz .................. 315/120 |
| 6,560,537 B1 | 5/2003 | Matthews |
| 2003/0106991 A1 * | 6/2003 | Klotz .................. 250/221 |

* cited by examiner

EMITTER-DETECTOR ASSEMBLY FOR A REFLEX PHOTOELECTRIC OBJECT DETECTION SYSTEM

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of the Invention

The present invention relates to utilizing a beam of light to detect the presence of objects, and more particularly to optical sensing equipment in which light from an emitter is returned by a retroreflector to a detector to create a light beam which is broken by objects to be detected.

2. Description of the Related Art

It often is desirable to detect the presence of objects moving along a conveyor line. This enables manufacturing and other types of equipment perform operations on the objects. Various object detection systems have been developed for this purpose.

One class of object detection systems are optical, using light to sense an object's presence. Within this optical class are reflex systems in which an emitter-detector assembly is located on one side of the path of the objects and a retroreflector, often called a target, is placed on the opposite side. A beam of light is sent from an emitter across the path to the retroreflector from which the light returns back across the path to a detector. An object moving along the path interrupts the beam of light, thereby providing an indication of the presence of the object.

Retroreflectors are sometimes called corner cube prisms or trihedral prisms because the reflecting surfaces are three mutually perpendicular faces like the corner of a cube. Light entering a retroreflector is reflected back 180° parallel to the incident light path, regardless of the reflector's orientation to the light beam. This kind of prism is designed to reflect any light ray or beam entering the prism back onto itself, even at very large angles of incidence. In comparison, a mirror only does that at the normal angle of incidence. This characteristic makes retroreflectors valuable for object detection, as the prism does not have to be precisely aligned with respect to the emitter-detector assembly, where precision alignment is difficult or time-consuming with other optical systems.

A reflex sensor should respond to light reflected from a retroreflector, but not respond to diffuse reflective objects, such as those being carried by the conveyor. The present technology accomplishes this in part by restricting the angle at which light is emitted by the light source and the field of view of the detector optics. These restrictions often require use of a relatively small retroreflective target and accurate sensor aiming, thus negating the principal advantage of retroreflectors, as precise aiming is not always easily accomplished in practical applications.

In another instance of present technology, the emitter-detector assembly has a coaxial design, such as shown in U.S. Pat. No. 3,996,476. Here, the emitter and detector devices are located one behind that other so that the emitted light path merges with the returned light path. This is accomplished with a lens of other optical element which directs the reflected light around the emitter onto the detector device behind. A disadvantage of this design is the requirement for careful mechanical alignment of the additional optical element. Furthermore, the optical and other components must be well designed, manufactured, and kept very clean to reduce internal light scattering. The lens and other optical elements of this system also attenuate the reflected light before reaching the detector thus degrading efficiency of the apparatus. The coaxial geometry is relatively sensitive to diffuse objects that are very close to the sensor. The resulting sensitivity to near objects and dirt on the lens is a significant practical disadvantage of prior coaxial emitter-detector assembly designs.

In another assembly the emitter and detector devices are arranged side by side with a beam splitter and a mirror to direct the emitted and received light along a common path between the emitter-detector assembly and the retroreflector. This system has some of the same disadvantages as the coaxial design.

Therefore, a need exists for an improved emitter-detector assembly for a retroreflective object detection system.

SUMMARY OF THE INVENTION

An object detection system has a retroreflector spaced from an emitter-detector assembly to sense the presence of objects there between. The emitter-detector assembly includes a light emission area, from which light is emitted toward the retroreflector, and has a light detection area, in which light impinging thereon from the retroreflector produces an electrical signal. The light emission area and the light detection area are concentric to each other.

In a first embodiment the emitter-detector assembly, the light emission area encircles the light detection area. Specifically, the light detection area comprises a photodetector and the light emission area comprises a plurality of light emitters located at different angles radially around the photodetector. The assembly preferably comprises a housing with inner and outer concentric tubular walls that form an inner chamber and an annular outer chamber. The plurality of light emitters is located in the outer chamber and transmits light from one end of the housing. The photodetector is within the inner chamber and responds to light received through that one end of the housing.

A second embodiment of the emitter-detector assembly has the light detection area extending around the light emission area. This embodiment can utilize as similar housing as the first embodiment, however in the second instance the light emitter is placed in the inner chamber and a plurality of photodetectors are in the outer chamber.

DETAILED DESCRIPTION OF THE INVENTION

Figure 1:
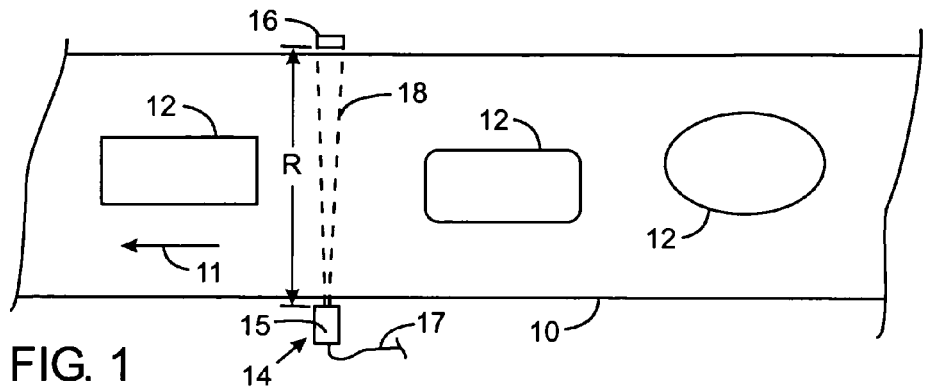
FIG. 1 illustrates a conveyor on which the present object detection system is located.

With initial reference to FIG. 1, a conveyor 10 travels in the direction indicated by arrow 11 and carries a plurality of objects 12. An optical object detection system 14 includes an emitter-detector assembly 15 located on one side of the conveyor 10 and a retroreflector 16 on the opposite side. The emitter-detector assembly 15 sends a beam of light 18 across the conveyor 10 which is reflected by the retroreflector 16 back toward the emitter-detector assembly. An object 12 traveling along the conveyor interrupts the light beam 18, which causes the emitter-detector assembly 15 to produce a positive object detected output signal. This signal is applied via output cable 17 to a controller of an apparatus (not shown) that processes the objects passing along the conveyor.

Figure 2:
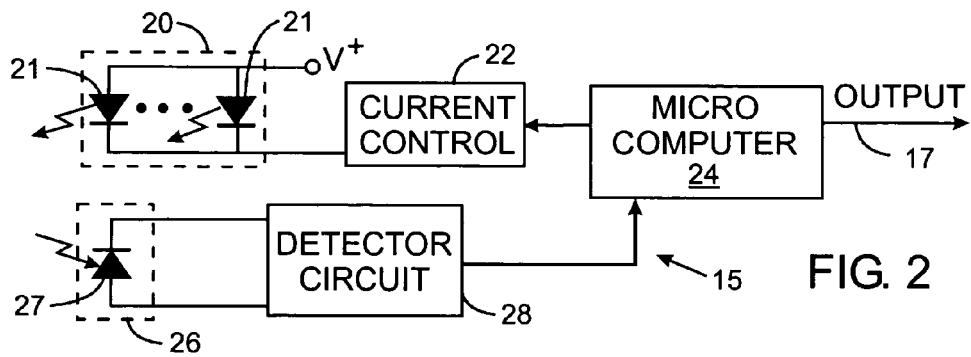
FIG. 2 is a first schematic circuit diagram of the object detection system.

FIG. 2 illustrates the circuitry of the emitter-detector assembly 15 that has a light source 20, which preferably is a plurality of light emitting diodes 21, but which may comprise semiconductor lasers, incandescent bulbs, a fluorescent bulb, a phosphorescent emitter, or an electroluminescent emitter. With some of these emitters the intensity of the generated light can be varied by a current control circuit 22 in response to a command signal received from a conventional microcomputer 24 similar the that used in previous optical detector systems. The microcomputer 24 has digital and analog inputs and outputs, to which the other components are connected, and an internal memory storing a software program which is executed to perform the object detection function.

The light reflected by the retroreflector 16 strikes a light sensor 26 which includes a photodetector 27, such as a photodiode, a phototransistor, a thermopile, a solid state imager, a photomultiplier tube, or a pyroelectric detector. An electrical signal is produced representing the amount of light striking the photodetector 27. That signal is processed by a detector circuit 28 that is connected to an input of the microcomputer 24 which responds by producing an output signal on cable 17 indicating whether an object 12 is present in front of the object detection system 14.

Figure 3:
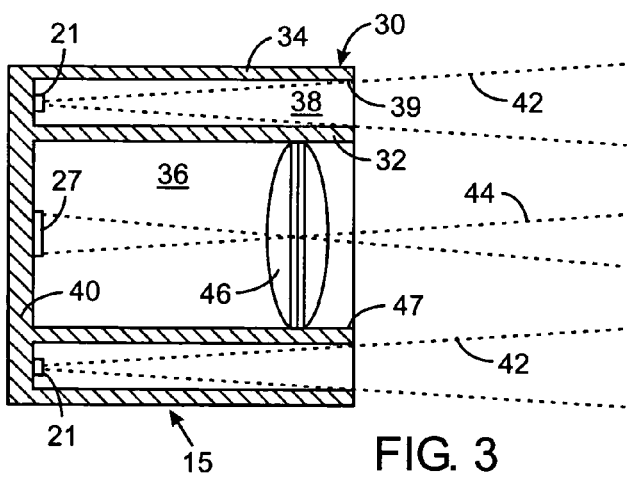
FIG. 3 is a cross section view through an emitter-detector assembly in the object detection system.
Figure 4:
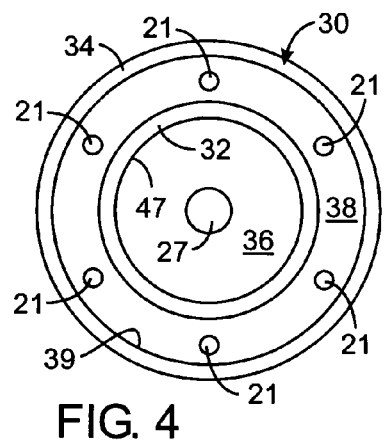
FIG. 4 is a view of the front of the emitter-detector assembly.

With reference to FIGS. 3 and 4, the emitter-detector assembly 15 has a concentric configuration. Specifically, a cylindrical tubular housing 30 has an inner tubular wall 32 which is concentric with the outer tubular wall 34, thereby forming an inner chamber 36 and an annular outer chamber 38. One end of the housing 30, and thus of the inner and outer chambers 36 and 38, is closed by a transverse end wall 40. The opposite end of the housing is open so that light can exit and enter the cavities, as will be described.

Six light emitters 21 are mounted on the interior surface of the end wall 40, equidistantly around the annular outer chamber 38. Each light emitter 21 produces a conically shaped light beam 42 which travels out the open end of the housing 30, through an aperture 39, and toward the retroreflector 16. A short distance from the emitter-detector assembly 15, the individual light beams 42 initially combine into a ring of illumination which continues to spread out, ultimately forming a single circular spot of light a farther distance away. Although the preferred embodiment employs six light emitting diodes 21 as the light source 20, fewer or more light emitters can be used as well as other types of devices as noted previously. Alternatively, the aperture 39 used to direct and limit the emission of the light can be replaced or combined with lenses, mirrors, and other optical components.

The light which is reflected by the retroreflector 16, returns in a second beam 44 through aperture 47, into the inner chamber 36 of the housing 30. In the preferred embodiment a convex lens 46 directs that second light beam 44 onto the photodetector 27 located within the inner chamber 36 at the center of the end wall 40. The convex lens 46 is optional and can be eliminated, replaced, or combined with other optical elements that restrict the field of view or direct the reflected light onto the photodetector 27. It is desirable to minimize the angle at which light is able to enter the housing's inner chamber 36 and impinge the photodetector 27, so that light from objects other than the retroreflector 16 does not interfere with the object detection function.

Figure 5:
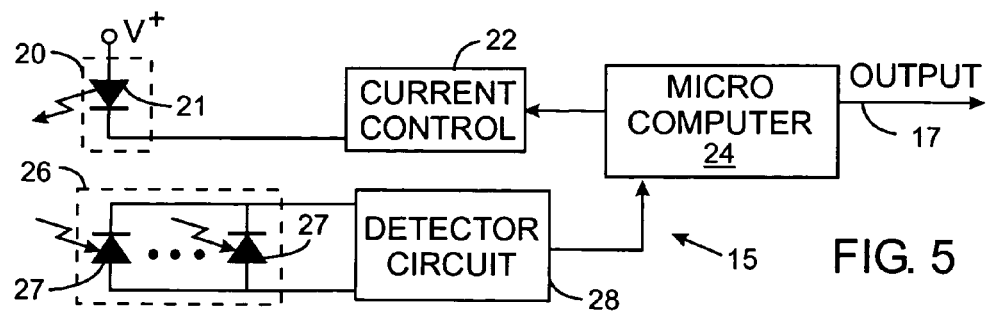
FIG. 5 is a second schematic circuit diagram of an object detection system.

Alternatively with reference to FIG. 5, a central light emitter 21 could be employed, which is mounted on the end wall 40 in the inner chamber 36 in place of the photodetector 27 in FIGS. 2 and 4. In this second embodiment of the emitter-detector assembly 15, an annular ring or plurality of photodetectors 27 is equidistantly spaced around within the annular outer chamber 38 in place of the light emitters 21. Light is emitted by this assembly from the inner chamber 36 through lens or aperture 47, and reflected light returns through the aperture 39 at the open end of the outer chamber 38.

In either embodiment, the concentric configuration of the emitter and detector assembly 15 minimizes the distance between the emitter and detector areas by extending one of those areas in a ring that completely surrounds the other area. Further, the width of the annular aperture 39, as well as the diameter of the central aperture 47, are optimized to match the angular reflective function of the retroreflector 16. By reducing the emitter and detector aperture areas that preferentially respond to defuse objects, and emphasizing those areas that preferentially respond to light from the retroreflector 16, discrimination between those types of objects is enhanced. This design characteristic makes the present emitter-detector assembly 15 very responsive to light from the retroreflector 16, and minimally responsive to light reflected from the surface of the objects 12 passing in front of the assembly.

This response characteristic is achieved by substantially matching the conical field of view of the photodetector to the conical size and direction of the emitted beam from the light source as given by the expression:

$$Srf = Srs \quad (1)$$

where Srf is the size of the photodetector field of view in steradians, and Srs is the size in steradians of the beam emitted by the light source 20.

It is preferred that the features of the emitter-detector assembly 15 be designed to maximize the ratio K of the light power Rs returned from the retroreflector 16 to the light power Rd returned from a 100% reflecting uniformly diffuse, or Lambertian, surface. That is K=Rs/Rd. Assume that the returned light power (in watts for example) from a 100% uniformly diffuse surface is given by:

$$Rd = (L \; As \; Ad \; Srf)/(2\pi R^2) \quad (2)$$

where L is the radiance of the source (in watts per steradian per square meter for example), As is the total emission surface area of the light emitting aperture 39, Ad is the total sensing surface area of the photodetecting aperture 47, Srf is the photodetector field of view (assuming Srs=Srf), and R is the distance from the emitter-detector assembly 15 to the reflective surface. Further assume that the return light signal Rs from the retroreflector 16 is defined by:

$$Rs=(L\ Srr)/(2\pi R^2) \int\int [G(x,R)dS\ dD] \quad (3)$$

where Srr is the area in steradians of the conical emitted light beam that is subtended by the retroreflector (assuming Srr<Srf), dS is an area element of the light emitting aperture, dD is an area element of the photodetector aperture, x represents the separation between the source aperture and detector aperture area elements, and G(x,R) is the gain of the retroreflector 16 (i.e. the ratio of the light power returned by a given retroreflector to that from a similar sized and positioned region of a 100% reflecting uniformly diffuse surface). For most applications, the sensing range is fixed, so R can be taken as a constant. Then G(x,R) is specific for any particular retroreflector and sensing range, and is only a function G(x) of the separation x between the emitter and detector area elements. The function G(x) is best determined empirically, and the integral performed numerically, since G(x) is in general a complex function of the retroreflective surface—which rarely approaches an ideal form. But certain general conclusions can be drawn, making simplifications and looking at limits in ideal cases.

The ratio K then is expressed as:

$$K=Rs/Rd=(Srr)/(Srf\ As\ Ad)\int\int [G(x)dS\ dD] \quad (4)$$

From this mathematical analysis it can be concluded that one way to maximize the value of K is to increase G(x), the quality of the reflector, Srr, the size of the reflector, or decrease Srf, the field of view of the sensor. However, it is the aim of the present invention to maximize K without resorting to large or expensive reflectors, or restricting the field of view of the sensor to the point where it becomes difficult to align and use.

It has been determined that for most retroreflective surfaces, G(x) is a maximum, Gmax, often in the neighborhood of 1000, for x=0, and then decreasing rapidly as x increases. We can then express the relative spatial reflection characteristics of a retroreflector somewhat independent of this maximum value by defining:

$$Gr(x)=G(x)/Gmax \quad (5)$$

One then may define a quality factor Q, representing the quality of the sensor design that compensates for these three aspects of retroreflector size, quality, as well as the sensor field of view, where:

$$Q=K\ Srf/(Srr\ Gmax)=(Rs\ Srf)/(Rd\ Srr\ Gmax)=\int\int [Gr(x)dS\ dD]/(As\ Ad) \quad (6)$$

Since Gr(x) is now always equal to or less than 1, and the integral of the source and detector area elements times Gr(x) will then at most be equal to As times Ad, then quality factor Q can have at most a maximum value of unity.

As a consequence, the quality factor Q is generally maximized by minimizing the average distance x between source and detector elements. It is preferred that the features of the emitter-detector assembly 15 be designed then that the ratio value of the quality factor Q approaches the maximum theoretical value of unity as close as possible. Prior designs have values of Q often significantly less than one quarter. By locating the light emission area close to and concentric with the light detection area, the quality factor Q can be made very close to unity, and the assembly can be designed to respond to light from the retroreflector over a much wider angle than prior designs without a significantly adverse response to light reflected from diffuse or semi-diffuse surfaces than would otherwise occur. In particular, compared to a typical sensor of prior art with a field of view less than three degrees, or about 0.002 Sr, the field of view of the current embodiment of this invention is over ten degrees, or about 0.030 Sr.

The geometry that reduces the average distance between the area elements of the light source and photodetector to a minimum is a concentric circular geometry. This can be seen most readily in the two limiting cases. In the following, it is assumed the detector is in the center, but the result is the same if the source is in the center. In the first case then, if the source area is small compared to the area of the detector, the source reduces to a thin circular ring on the outside of the detector. It is clear the source can not get closer to the detector than this annular ring around it. The average distance between source and detector elements is then about 1.13 R. In the second case, where the detector is small, the detector reduces to a dot in the center of the circular source. In that case, the average distance between the area elements of the circle and the center is 0.66 R. Again, it is clear the detector can not get closer to the source than being at its center.

For large sensor geometries, short sensing ranges, and quality retroreflectors, in the limit, Gr(x) approaches a step function. Gr(x) is close to unity as x increases, and then decreases very rapidly to zero above some value of x. If this value of x is very small, then in this simplified limiting case, the integral of [Gr(x) dS dD] becomes proportional to the circumference of the circular region between emitter and detector regions.

If Gr(x) were constant from x=0 to some finite value D, and then dropped to zero, we would choose the maximum distance from the source to the detector to be equal or less than D. If the detector area were a circle of diameter D/n (where n>1), then the source should in that case be a ring of maximum additional thickness D–D/n around the detector.

The foregoing description was primarily directed to a preferred embodiment of the invention. Although some attention was given to various alternatives within the scope of the invention, it is anticipated that one skilled in the art will likely realize additional alternatives that are now apparent from disclosure of embodiments of the invention. Accordingly, the scope of the invention should be determined from the following claims and not limited by the above disclosure.

I claim:

1. An object detection system comprising
   a retroreflector; and
   a emitter-detector assembly having a light emission area from which a light beam is emitted toward the retroreflector and having a light detection area in which light impinging thereon from the retroreflector produces an electrical signal, wherein the light emission area and the light detection area are concentric with one extending around the other;
   wherein the object detection system has a quality factor Q that is greater than 0.25, where the quality factor is given by the expression:

$$Q=(Rs\ Srf)/(Rd\ Srr\ Gmax)$$

in which Rs is a signal produced by the emitter-detector assembly in response to returned light from a retroreflector, Srf is the size of the field of view in steradians of the light detection area, and Srr is the size in steradians of the light beam that is subtended by the retroreflector, Rd is the signal produced by the emitter-detector assembly in response to returned light from a 100% uniformly diffuse surface, and Gmax is a maximum reflectance of the retroreflector compared to light returned from a 100% uniformly diffuse surface.

2. The object detection system as recited in claim 1 wherein the light emission area extends around the light detection area.

3. The object detection system as recited in claim 2 wherein the light detection area comprises a photodetector and the light emission area comprises a plurality of light emitters located at different angles axially around the photodetector.

4. The object detection system as recited in claim 1 wherein the light detection area extends around the light emission area.

5. The object detection system as recited in claim 4 wherein the light emission area comprises a light emitter, and the light detection area comprises a plurality of photodetectors located at different angles axially around the light emitter.

6. An object detection system comprising:
a retroreflector; and
a emitter-detector assembly having a light emission area from which a light beam is emitted toward the retroreflector and having a light detection area in which light impinging thereon from the retroreflector produces an electrical signal, wherein the light emission area and the light detection area are concentric with one extending around the other;
wherein the light detection area is substantially equal in size to the light emission area and wherein the object detection system has a quality factor 0 that is greater than 0.25, where the quality factor is given by the expression:

$$Q=\int\int[Gr(x)dS\ dD]/(As\ Ad)$$

where As is the size of the light emission area, Ad is the size of the light detection area, dS is an area element of the light emitting aperture, dD is an area element of the photodetector aperture, x is the separation between the source aperture and detector aperture area elements, and Gr(x) is the relative gain of the retroreflector at the displacement x between source and detector area elements compared to the maximum attainable return.

7. The object detection system as recited in claim 6 wherein the emitter-detector assembly further comprises a housing having an inner chamber in which one of the light detection area and the light emission area is located, and an annular outer chamber in which the other one of the light detection area and the light emission area is located.

8. The object detection system as recited in claim 6 wherein the light emission area comprises at least one light emitter selected from the group consisting of a light emitting diode, a laser, an incandescent bulb, a fluorescent bulb, a phosphorescent emitter, and an electroluminescent emitter.

9. The object detection system as recited in claim 6 wherein the light detection area comprises at least one device selected from the group consisting of a photodiode, a phototransistor, a thermopile, a solid state imager, a photomultiplier tube, and a pyroelectric detector.

10. An emitter-detector assembly for object detection system having a retroreflector, the emitter-detector assembly comprising:
a light emission section comprising a light emitter assembly from which a light beam emanates in a first path; and
a light detection section comprising a photodetector which produces an electrical signal in response to light impinging thereon from the retroreflector;
wherein the light emitter assembly is concentric with the light detection section, and comprises a plurality of light emitters located at different angles axially around the photodetector.

11. The emitter-detector assembly as recited in claim 10 wherein the light detection section comprises a photodetector and the light emitter assembly extends around the photodetector.

12. The emitter-detector assembly as recited in claim 10 wherein the light emission section comprises at least one light emitter selected from the group consisting of a light emitting diode, a laser, an incandescent bulb, a fluorescent bulb, a phosphorescent emitter, and an electroluminescent emitter.

13. The emitter-detector assembly as recited in claim 10 wherein the light detection section comprises at least one device selected from the group consisting of a photodiode, a phototransistor, a thermopile, a solid state imager, a photomultiplier tube, and a pyroelectric detector.

14. The emitter-detector assembly as recited in claim 10 wherein the light detection section is substantially equal in cross-sectional area to the light emission section.

15. The emitter-detector assembly as recited in claim 10 having a quality factor Q that is greater than 0.25, where the quality factor is given by the expression:

$$Q=\int\int[Gr(x)dS\ dD]/(As\ Ad)$$

where As is the size of the light emission section, Ad is the size of the light detection section, dS is an area element of the light emitting aperture, dD is an area element of the photodetector aperture, x is the separation between the source aperture and detector aperture section elements, and Gr(x) is the relative gain of the retroreflector at the displacement x between source and detector section a*ea elements compared to the maximum attainable return.

16. The emitter-detector assembly as recited in claim 10 further comprising a housing having an inner chamber in which one of the light detection section and the light emission section is located, and an annular outer chamber extending around the inner chamber and in which the other one of the light detection section and the light emission section is located.

* * * * *